June 2, 1953  C. E. DYSARZ  2,640,636
WHEEL CARRIER
Filed Aug. 14, 1948
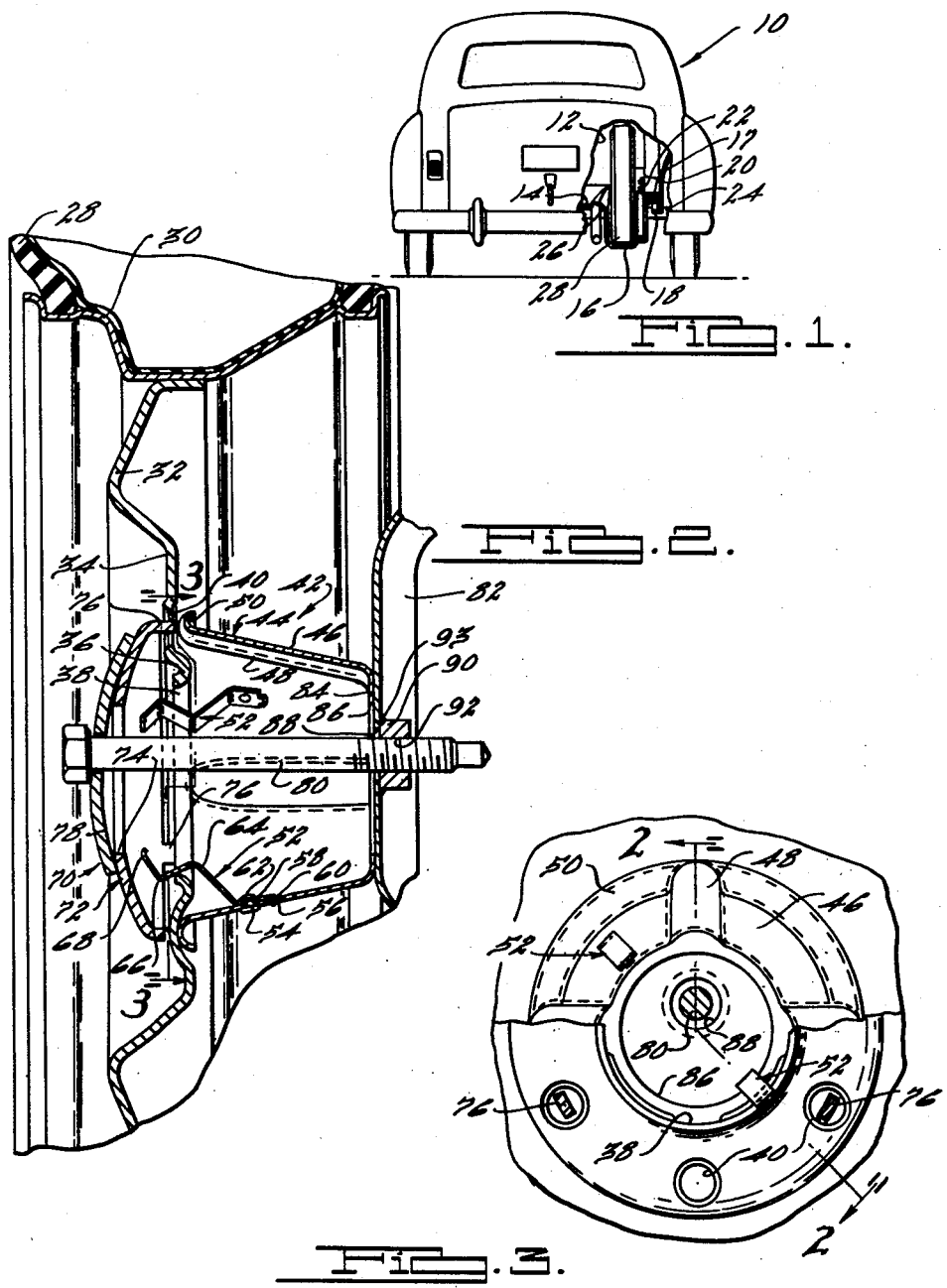
INVENTOR.
Charles E. Dysarz.
BY
Harness and Harris
ATTORNEYS.

Patented June 2, 1953

2,640,636

UNITED STATES PATENT OFFICE 2,640,636

WHEEL CARRIER

Charles E. Dysarz, Huntington Woods, Mich., assignor to Chrysler Corporation, Highland Park, Mich., a corporation of Delaware Application August 14, 1948, Serial No. 44,290

9 Claims. (Cl. 224—42.24)

This invention relates to motor vehicles and especially to vehicles such as automobiles in which the spare tire is carried in a luggage or other compartment. In particular the invention relates to a spare tire carrier having resilient catches which may serve securely to position and hold the wheel in place prior to its being bolted down.

An object of the present invention is to provide a wheel carrier of the foregoing type to which the wheel may be readily attached and removed with a minimum of effort.

Another object is to produce a light weight sheet metal support susceptible to simple techniques of manufacture such as stamping.

A further object of the invention is to provide a construction comprising a small number of parts cheap and easy to fabricate.

Still another object is to provide a carrier that is rugged and sturdy such as to require no attention relative to adjustments and maintenance.

Yet another object is to provide a structure such that the more durable components protect the other components.

Other objects of this invention will appear in the following description and appended claims, reference being had to the accompanying drawing forming a part of this specification wherein like reference characters designate corresponding parts in the several views.

Fig. 1 is an elevational view, partly in section, of a vehicle equipped with the present invention;

Fig. 2 is a longitudinal section of the wheel carrier; and

Fig. 3 is an axial view of the carrier.

Before the present invention is explained in detail, it is to be understood that the invention is not limited in application to the details of construction and arrangement of parts illustrated in the accompanying drawing since the invention is capable of other embodiments and of being practiced or carried out in various ways. Also it is to be understood that the phraseology or terminology employed herein is for the purpose of description and not of limitation and it is not intended to limit the invention claimed herein beyond the requirements of the prior art.

In the drawing there is illustrated, by way of example, a preferred embodiment of the present invention as applied to the rear compartment of an automotive vehicle. It will be understood that the invention may be applied also to a front compartment of such a vehicle or conceivably to a side compartment thereof. As to Figures 1, 2, and 3, 10 generally indicates a vehicle which may be provided as at 12 with a rear deck lid. By means of this deck lid access may be had to the rear luggage compartment such as defined at the bottom by rear floor pan 14. Attached to this pan 14 may be a well 16 which extends down below the level of the floor pan. On the other side of the well may be a continuation of the floor pan 17 adapted to be secured to the side member 18 of the automobile frame. Attached also to this side member 18 may be an annularly recessed portion of the body which goes to compose the rear wheel housing 20. The well 16 and wheel housing 20 may be located somewhat to the rearward of such members as the stabilizer bracket 22 and the rear axle 24 of the vehicle.

The primary purpose of the well 16 is to provide an enclosed storage space for the spare tire, and it is relieved such as at portion 26 to allow ready insertion and removal of this tire 28. The tire 28 may be mounted on a rim such as at 30 which together with the web 32 goes to form the spare wheel for the vehicle. This web or body part of the spare road wheel includes a fastening flange 34 extending radially inward and having a plane or a turned inner margin 36 such as may define a relatively large central or hub opening 38. Bordering this hub opening may be located an annular row of apertures or bolt holes 40. These bolt holes, best seen spaced around the opening 38 in Fig. 3, may run to the number of 5 or 6 as convenient.

For supporting this road wheel there may be provided a support or carrier comprising a number of constituents. The spacer cup shown at 42 is adapted to fit adjacent the inner face of the road wheel and may include resilient catches, later to be described in detail, and a hollow mount 44. This mount 44 may have a shell component 46 which takes the form of a hollow annular body. Shell 46 is represented as assuming frustoconical configuration. Yet conceivably it may take the form of an hollow cylinder or perhaps a prism. This component may be formed with a plurality of embossments or stiffening ribs 48 running longitudinally thereof and serving as reinforcements. In Fig. 3 the ribs may be seen to be spaced circumferentially and to extend more or less the entire length of the shell. At the one end of the shell, the mount may be provided with a rim component or flange 50 extending radially outward. This flange, which may be continuous, presents a transverse face relative to the shell and may be adapted to receive the fastening flange of the road wheel. Flange 50 may extend radially outward of the plurality of catches 52 which are adapted to engage the road wheel. The wall of the shell may be apertured as at 54 and 56, the apertures being desirably aligned longitudinally in order to receive the catches 52. These catches, being formed of flat springs, may be pierced as at 58 and provided with a tang 60 which aperture and tang are adapted to register with the aforesaid apertures 54 and 56. Additional fastening means, such as at 62 which may be a rivet or the like, may be provided to anchor the catches securely to the shell. Each catch may have a resilient shank 64 which is offset to present a cam or nose 66 which may terminate in a free end as at 68. These catches may be arranged such that their spring noses are disposed radially outward, thereby presenting an engaging surface for the inner margin of the fastening flange 34. Since the catches may be opposed, their spring action may tend to urge the fastening flange to engage the rim flange of the spacer cup in a straightforward or motion of direct compression. Thus there will be no tendency for transverse slippage or dislodgement.

An additional retainer such as at 70 may be provided also for the road wheel. This retainer may consist of a spider 72 along with certain retaining means. The spider may be apertured as at 74 to provide a central opening and around its periphery may be provided with transverse lugs 76. These lugs may be adapted to be received by the bolt holes 40 in the face of the fastening flange of the road wheel. These lugs may run to any number as desired but do not necessarily enter all the bolt holes for any one position of the fastening flange. Retaining means for this spider may include a washer 78 which may be apertured to receive a bolt 80. The spider and retaining means may serve to cooperate with the resilient springs 52 to hold the wheel securely in place. At its inner end the spacer cup and the bolt 80 may be mounted in common to a trunk spacer wall or body mounting bracket 82. As to the support provided for the body bracket, its one end may desirably be rigidly secured to the wheel housing while the other end may be fastened to the frame side member 18 appearing in Fig. 1. Should the outboard extension of the rear floor pan happen to be placed between the bracket and the side member, then the frame end of bracket 82 may also be welded to the floor pan as well as being bolted through the floor pan to the side member. The spacer cup may be rigidly affixed to the bracket 82 by means of an inwardly directed radial flange 84 such as by welding, riveting, or the like. Along with the rim flange, flange 84 may cooperate with the reinforcing ribs 46 in preventing cross sectional distortion of the hollow spacer. This mounting flange may be provided with a central aperture 86 defining an opening adapted to register with an aperture 88 formed in the bracket 82. In these registered apertures may be provided a nut 90 which may be bored as at 92 and tapped. This nut may be attached to the bracket by welding or other means, as indicated at 93. The nut may be adapted to receive the threaded end of bolt 80 and provide a suitable anchoring means for this bolt.

As to the operation of the device of Figs. 1 to 3, with the retainer out of the way the wheel may be inserted in the spare tire well such that the hub opening is embraced by the spring fasteners 52. A slight axial thrust will force the fastening flange up against the rim flange 50 of the spacer cup. Noses 66 of the resilient catches may thereupon expand radially outward and detachably lock the web of the wheel up snug against the face of the spacer cup. The action just described serves positively to locate the wheel relative to the carrier and to position it firmly in place. The spider 72 may next be mounted in place such that its lugs are received by the bolt holes spaced around the hub openings of the fastening flange, and then by means of the washer and bolt the spider may be firmly bolted into place. The retainer and springs may serve to cooperate in holding the wheel in place thereafter. Depending of course upon the size selected for the springs, the retainer conceivably may be left off altogether, although its presence is preferable. The carrier as described may be formed from light sheet metal as by some easy manufacturing process such as stamping. It will tend to be light in weight and of rugged construction. Provision of the embossments or ribs 46 is, of course, optional and may depend largely on the thinness and natural rigidity of the sheet metal selected as the material to be used. Also conceivable is the use of a plastic or other resinous material to form the mount portion of the spacer cup.

What is claimed is:

1. In a support for road wheel structure, said road wheel structure including a wheel fastening flange extending radially inwardly and having a turned inner margin defining a hub opening, said support having flange means, latch means, and a metal shell, said shell having a central axis and terminating therealong in the flange means and having the latch means thereadjacent and carried by the support being adapted to receive coaxially the wheel structure, the flange means being disposed in a general transverse plane to the shell and effective concentrically to abut said wheel fastening flange, said latch means comprising spring fingers presenting outer yieldble portions conforming to a path of revolution having a slightly larger outside diameter than the diameter of the hub opening, the aforesaid outer yieldable portions of said spring fingers projecting beyond the plane of the flange means for reception within said hub opening when said wheel fastening flange is placed concentrically adjacent said flange means, and being effective yieldably to engage the inner margin of the wheel structure to hold the wheel structure in juxtaposed relationship to the plane of the flange means.

2. In a carrier for a road wheel, in combination, a frusto-conical shell having a central axis, support means for the smaller end of the shell, the shell having circumferentially spaced reinforcing embossments extending axially from the smaller end to the larger end, an uninterrupted rim attached to the larger end of the shell to rigidify it and extending radially therefrom, the shell having a plurality of pairs of axially aligned apertures in the wall thereof adjacent said larger end, the pairs of apertures being transversely aligned and circumferentially spaced, a plurality of flat spring catches, each catch having a free end and a fixed end provided with a tang and an aperture, the tang being embraced by one aperture of each of said pairs and the aperture being adapted to register with the other aperture of each of said pairs for fastening purposes, said free end having an offset portion forming a resilient nose, and a plurality of fasteners, each of said fasteners being adapted to be received by said registering apertures, whereby said noses project radially outward of said central axis.

3. A support for a wheel having a circular fastening flange defining a central opening, comprising: an annular mount having a central axis and adapted to be fixedly supported at one end thereof, said mount terminating therealong in transverse flange means faced to receive said fastening flange, and a plurality of spring catches, each being affixed at one end to said mount in circumferential spacing and protruding beyond said means, the protuberance having an offset portion forming a nose and being resiliently adapted to be received in said opening, said noses extending radially and being urged to expand upon clearance of said opening to bias said flange and face into engagement, said supported end of the mount being provided with a mounting flange disposed radially inward, said mount being of frusto-conical configuration reinforced with longitudinal ribs.

4. A support for a wheel having a circular fastening flange defining a central opening, comprising: an annular mount having a central axis and adapted to be fixedly supported at one end thereof, said mount terminating therealong in transverse flange means faced to receive said fastening flange, and a plurality of spring catches each being affixed at one end to said mount in circumferential spacing and protruding beyond said means, the protuberance having an offset portion forming a nose and being resiliently adapted to be received in said opening, said mount being formed with longitudinal embossments, said catches being tanged and riveted to said mount in spaced relation to said embossments.

5. In a carrier for a spare tire having a radial fastening flange with a turned inner margin defining a central opening, a mount having a free end and generally axially extending walls deflected substantially transversely outwardly at said free end to form flange means bordering thereabout, the flange means having an outwardly facing and transversely disposed surface-presenting portion, and resilient catch means affixed to said axially extending mount walls to extend axially beyond the plane of the transverse flange means and generally adjacent the latter, said catch means comprising a plurality of spring fingers forcible into reception in said fastening flange central opening for resiliently engaging the turned inner margin thereof to hold the adjacent portions of the fastening flange in juxtaposition to the plane of the transverse flange means.

6. In a carrier for a spare tire having a radial fastening flange with a turned inner margin defining a central opening, a mount having a free end and a flange means bordering therearound, the flange means having an outwardly facing and transversely disposed surface-presenting portion, and resilient catch means having anchoring tangs and rivets associated with the mount and adapted to be received in said central opening for urging said margin and fastening flange portions thereadjacent into a surface contact with said surface-presenting portion limited to pure compression, said mount being of frusto-conical configuration having an inside wall to which said catch means is anchored by the tangs and rivets, said catch means extending in adjacency along said flange means radially inwardly thereof.

7. In a carrier for a spare tire wheel having a radial fastening flange with a turned inner margin defining a central opening, a mount having a free end and generally axially extending walls deflected transversely outwardly at said end to form continuations providing flange means about said end, the flange means presenting outwardly facing portions transversely disposed in a common plane and being engageable by said radial fastening flange when the adjacent turned inner margin therewithin is brought into adjacency with the free end of the mount, and resilient catch means carried by said axially extending walls so as engageably to be received by said turned inner margin and presenting at least two diametrically opposed cam noses tending mutually to counterbalance their respective transverse biasing components, said catch means cooperatively maintaining engagement with said turned inner margin to hold said adjacent flange means and outwardly facing mount portions in engagement along a substantially common plane and said mount walls being formed with transverse curvature to have longitudinal stiffness and said flange means being peripherally continuous therewith to the end that the embossments and means cooperate to prevent undue distortion of said mount when said spare tire wheel is applied thereto in the above described manner.

8. For use in a vehicle compartment for storing a road wheel having a hub flange provided with a hub opening and circumferentially spaced apertures therearound, the combination comprising a supporting part having a tapped bore for receiving a wheel retaining bolt, a shell adapted to be secured to the supporting part in surrounding relation to the mouth of said bore and having substantially longitudinal walls disposed to extend away from the mouth of said bore in generally spaced relation with the axis thereof, said shell being provided with wheel-engaging flange forming means carried by said longitudinal walls such as to be disposed generally transversely to the axis of said bore and at a location removed from the mouth thereof, and resilient spring fingers carried remote to said bore mouth by the longitudinal walls of said shell, said resilient spring fingers being disposed cooperatively adjacent said wheel-engaging flange forming means for being resiliently engaged with the wheel within said hub opening to hold the hub flange adjacent in engaged relation with the wheel engaging flange forming means of the shell.

9. For use in a vehicle compartment for storing a rod wheel having a hub flange provided with a hub opening and circumferentially spaced apertures therearound, the combination comprising a supporting part having a tapped bore for receiving a wheel retaining bolt, and a shell adapted to be secured to the supporting part in surrounding relation to the mouth of said bore and having substantially longitudinal walls disposed to extend away from the mouth of said bore in generally spaced relation with the axis thereof, said shell being provided with flange forming means affixed to the longitudinal walls thereof such as to be disposed generally transversely to the axis of said bore and at a location removed from the mouth thereof for engagement by the hub flange of the road wheel, said shell being further provided with resilient spring fingers formed fast to the longitudinal walls thereof adjacent the juncture of the latter with the transverse flange means and in general inwardwise disposition thereto for being received in the hub opening when said hub flange engages said flange forming means, and yieldably holding the hub flange portions thereadjacent in engagement with said flange forming means.

CHARLES E. DYSARZ.

References Cited in the file of this patent

UNITED STATES PATENTS

| Number | Name | Date |
|---|---|---|
| 1,322,680 | Draver | Nov. 25, 1919 |
| 1,883,032 | Smith | Oct. 18, 1932 |
| 1,915,564 | Wise | June 27, 1933 |
| 1,929,679 | Duncan | Oct. 10, 1933 |
| 2,107,015 | Short | Feb. 1, 1938 |
| 2,109,684 | Short | Mar. 1, 1938 |
| 2,244,872 | Fergueson | June 10, 1941 |